US012200233B2

(12) United States Patent
Bustin et al.

(10) Patent No.: US 12,200,233 B2
(45) Date of Patent: Jan. 14, 2025

(54) LIMITED RATE CONTEXT BASED EYE GAZE ENCODING

(71) Applicant: GM GLOBAL TECHNOLOGY OPERATIONS LLC, Detroit, MI (US)

(72) Inventors: Ronit Bustin, Kfar Saba (IL); Omer Tsimhoni, Bloomfield Hills, MI (US); Andrea Forgacs, Kfar Saba (IL); Yi Guo Glaser, West Bloomfield, MI (US); Daniel S. Glaser, West Bloomfield, MI (US); Ron M. Hecht, Raanana (IL)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 18/165,476

(22) Filed: Feb. 7, 2023

(65) Prior Publication Data
US 2024/0275994 A1    Aug. 15, 2024

(51) Int. Cl.
| | |
|---|---|
| *H04N 19/25* | (2014.01) |
| *G06F 3/01* | (2006.01) |
| *G06T 7/70* | (2017.01) |
| *G06V 20/59* | (2022.01) |
| *H04N 19/179* | (2014.01) |

(52) U.S. Cl.
CPC .......... *H04N 19/25* (2014.11); *G06F 3/013* (2013.01); *G06T 7/70* (2017.01); *G06V 20/597* (2022.01); *H04N 19/179* (2014.11); *G06T 2207/30201* (2013.01); *G06T 2207/30252* (2013.01)

(58) Field of Classification Search
CPC ...... H04N 19/25; H04N 19/179; G06F 3/013; G06T 7/70; G06T 2207/30201; G06T 2207/30252; G06V 20/597; G06V 40/18; G06V 40/19
See application file for complete search history.

(56) References Cited

U.S. PATENT DOCUMENTS

| | | | |
|---|---|---|---|
| 11,620,838 B2 * | 4/2023 | Segal | G06N 20/00 382/103 |
| 2023/0106673 A1 * | 4/2023 | Asghar | B60K 35/60 382/104 |
| 2023/0206488 A1 * | 6/2023 | Puri | G06V 40/171 382/100 |
| 2024/0087561 A1 * | 3/2024 | Pathak | G06F 3/013 |

* cited by examiner

*Primary Examiner* — Farzana Hossain
(74) *Attorney, Agent, or Firm* — Quinn IP Law

(57) ABSTRACT

A system and method for limited rate context-based eye gaze encoding includes generating, based on an outward looking camera situated in a vehicle, a first video stream of a surrounding environment to a controller. The controller generates a scene description based on the first video stream and selects a corresponding scene from a predefined list of known scenes. Further, the controller, based on the selected corresponding scene, selects a codebook of encoding and decoding parameters from a plurality of predefined codebooks. Based on an inward looking camera situated in the vehicle, a second video stream of a face of a driver to an eye tracker controller is generated, where the eye tracker controller estimates a gaze direction of the driver. Encoded data comprising the estimated gaze direction of the driver is transmitted over a bandwidth limited channel to a decoder, based on the selected codebook, the encoded data.

20 Claims, 7 Drawing Sheets

LIMITED RATE CONTEXT BASED EYE GAZE ENCODING

Vehicles are a staple of everyday life. Special use cameras, microcontrollers, laser technologies, and sensors may be used in many different applications in a vehicle. Cameras, microcontrollers and sensors may be utilized in enhancing automated structures that offer state-of-the-art experience and services to the customers, for example in tasks such as body control, camera vision, information display, security, autonomous controls, etc. Vehicular vision systems may also be used to assist in vehicle control.

Vehicular vision systems may be used to provide the vehicle operator with information of the environment surrounding the vehicle. The vision systems may also be used to greatly reduce blind spot areas to the sides and rear of the vehicle. Vison systems may also be used to monitor the actions and movements of occupants, especially the vehicle operator. In particular, driver monitoring systems may include vision systems that may be used to track a vehicle operator's head and eye position and movement, e.g., eye gaze. Eye gaze may generally refer to the direction that a driver's eyes are fixated at any given instant. Such systems may detect an operator eye gaze and may be used in numerous useful applications including detecting driver distraction, drowsiness, situational awareness and readiness to assume vehicle control from an automated driving mode for example. However, driver monitoring systems may require processing large amounts of image data and thus require large amounts of processing resources thereby theoretically reducing associated response times. Accordingly, it is desirable to provide context-based encoding and decoding of eye gaze under a limited rate.

SUMMARY

Disclosed herein are a system and methods for limited rate context-based eye gaze encoding. As disclosed herein, a system for limited rate context-based eye gaze encoding may include an outward looking camera situated in a vehicle to capture and send a first video stream of a surrounding environment to a controller, wherein the controller, based on the first video stream, may generate and encode a scene description. Furthermore, the controller may select, based on the encoded scene description, a corresponding scene from a predefined list of known scenes. The controller may also select, based on the selected corresponding scene, a codebook of encoding and decoding parameters from a plurality of predefined codebooks. The system may also include an inward looking camera, situated in the vehicle, to capture and send a second video stream, e.g., Infrared, visible lights, or other electromagnetic illumination, of a face of a driver to an eye tracker controller, wherein the eye tracker controller, based on the second video stream, may estimate a gaze direction of the driver. The system may also include an encoder to output, based on the selected codebook, an encoded data comprising the estimated gaze direction of the driver and where a transmitter, within the vehicle, may send the encoded data over a bandwidth limited channel to a decoder. The decoder may receive the selected codebook from the controller and may decode, based on the selected codebook, the encoded data.

Another aspect of the disclosure may be a system that includes an efficiency estimation component that may receive the encoded data and determine an efficiency of the encoding.

Another aspect of the disclosure may include where if the efficiency of the encoding is below a predetermined threshold the selected codebook may be replaced with a different codebook.

Another aspect of the disclosure may be a system where the sensor may detect an object strike between the vehicle door and the obstacle.

Another aspect of the disclosure may be a system where, based on data from the inertial measurement unit, estimate a vehicle door impact severity.

Another aspect of the disclosure may include where the decoder is located within the vehicle.

Another aspect of the disclosure may include where the inward looking camera situated in the vehicle may capture an image of a hand of the driver and where a hand position controller may estimate an orientation of the hand of the driver, and where the encoder may output the encoded data including the orientation of the hand of the driver.

Another aspect of the disclosure may include where the inward looking camera situated in the vehicle may capture an image of a head of the driver and where a head orientation controller may estimate an orientation of the head of the driver, and where the encoder may output the encoded data including the orientation of the head of the driver.

Another aspect of the disclosure may include where the inward looking camera situated in the vehicle may capture an image of a body of the driver and where a body pose controller may estimate a pose of the body of the driver, and where the encoder may output the encoded data comprising the pose of the body of the driver.

Another aspect of the disclosure may include where the controller may select the corresponding scene from the predefined list of known scenes also based on a location, or a speed, or an acceleration, or a pedal position, or a turn signal status of the vehicle.

Another aspect of the disclosure may include where the controller may generate a new codebook based on the corresponding scene.

Another aspect of the disclosure may include a method for limited rate context-based eye gaze encoding. The method may include capturing and sending, using an outward looking camera situated in a vehicle, a first video stream of a surrounding environment to a controller. The method may also include generating, by the controller, a scene description based on the first video stream and selecting, by the controller, based on the scene description, a corresponding scene from a predefined list of known scenes. The method may also include selecting, by the controller, based on the selected corresponding scene, a codebook of encoding and decoding parameters from a plurality of predefined codebooks and a capturing and sending, using an inward looking camera situated in the vehicle, a second video stream of a face of a driver to an eye tracker controller. The method may continue by estimating, by the eye tracker controller, based on the second video stream, a gaze direction of the driver and outputting, by an encoder, based on the selected codebook, an encoded data comprising the estimated gaze direction of the driver. The method may conclude by sending, by a transmitter within the vehicle, the encoded data over a bandwidth limited channel to a decoder, and decoding, by the decoder, based on the selected codebook, the encoded data.

Another aspect of the method may include receiving the encoded data and determining an efficiency of the encoding.

Another aspect of the method may include replacing the selected codebook if the efficiency of the encoding is below a predetermined threshold with a different codebook.

Another aspect of the method may include where the decoder is located within the vehicle.

Another aspect of the method may include capturing, using the inward looking camera situated in the vehicle, an image of a hand of the driver, and estimating, using a hand position controller, an orientation of the hand of the driver, and outputting, by the encoder, the encoded data comprising the orientation of the hand of the driver.

Another aspect of the method may include capturing, using the inward looking camera situated in the vehicle, an image of a head of the driver to a head, and estimating, using a head orientation controller, an orientation of the head of the driver, and outputting, by the encoder, the encoded data comprising the orientation of the head of the driver.

Another aspect of the method may include capturing, using the inward looking camera situated in the vehicle, an image of a body of the driver, and estimating, using a body pose controller, a pose of the body of the driver, and outputting, by the encoder, the encoded data comprising the pose of the body of the driver.

Another aspect of the method may include selecting the corresponding scene from the predefined list of known scenes based also on a location, or a speed, or an acceleration, or a pedal position, or a turn signal status of the vehicle.

Another aspect of the method may include selecting the corresponding scene from the predefined list of known scenes based also on a detected target and an amount of free space around the vehicle.

Another aspect of the method may include generating a new codebook based on the corresponding scene.

Another aspect of the disclosure may include a method for on-line limited rate context-based eye gaze encoding including capturing and sending, using an outward looking camera situated in a vehicle, a video stream of a surrounding environment to a controller and generating, by the controller, a scene description based on the first video stream. The method may also include generating, by the controller, based on the scene description, a codebook of encoding and decoding parameters. The method may further include capturing and sending, using an inward looking camera situated in the vehicle, a second video stream of a face of a driver to an eye tracker controller and estimating, by the eye tracker controller, based on the second video stream, a gaze direction of the driver. The method may continue by outputting, by an encoder, based on the codebook, an encoded data comprising the estimated gaze direction of the driver and sending, by a transmitter within the vehicle, the encoded data at a first rate over a bandwidth limited channel to a decoder. The method may conclude by sending, by the transmitter within the vehicle, the scene description at a second rate over the bandwidth limited channel to the decoder, wherein the second rate is lower than the first rate, and decoding, by the decoder, based on the codebook, the encoded data.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
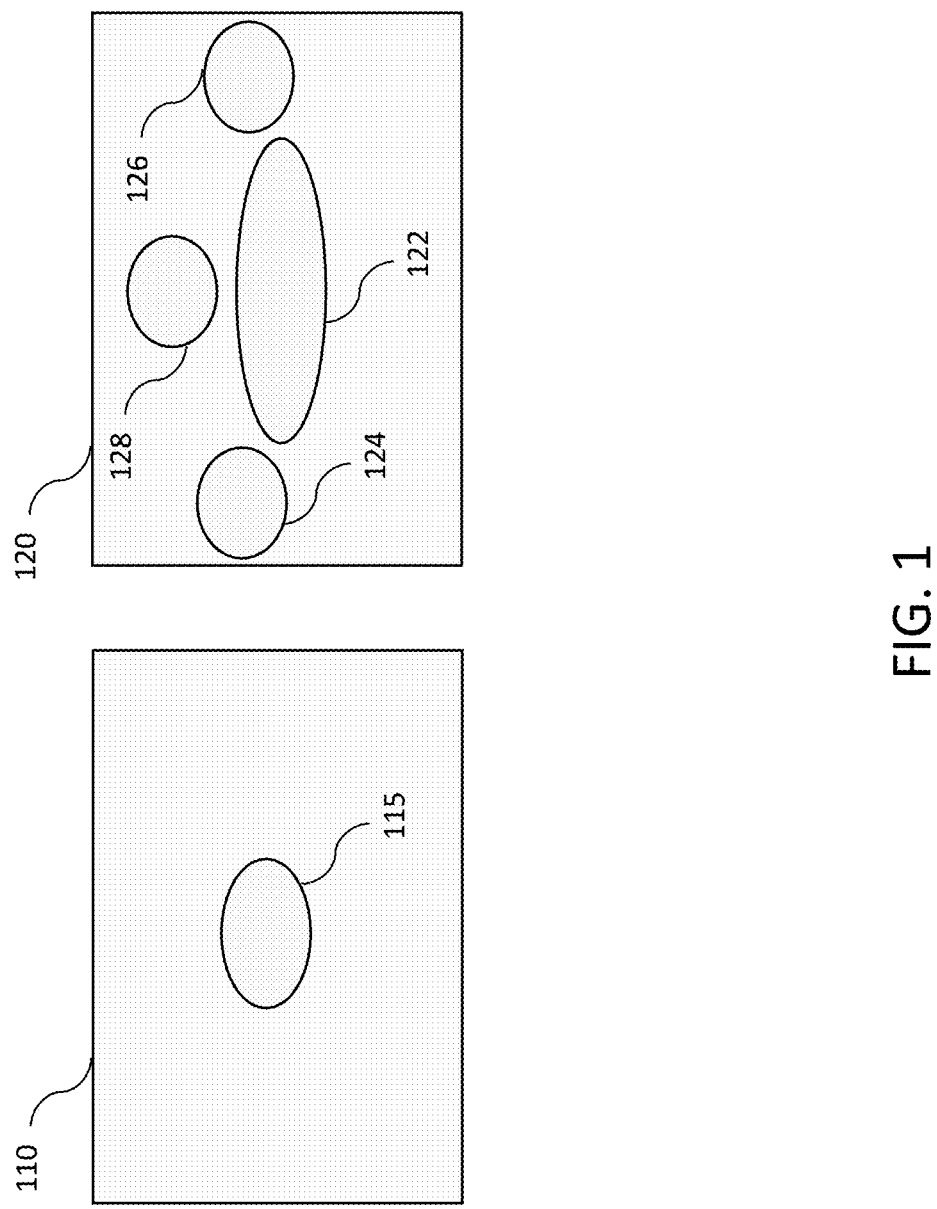
FIG. 1 is an illustration of two eye gaze pattern examples, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
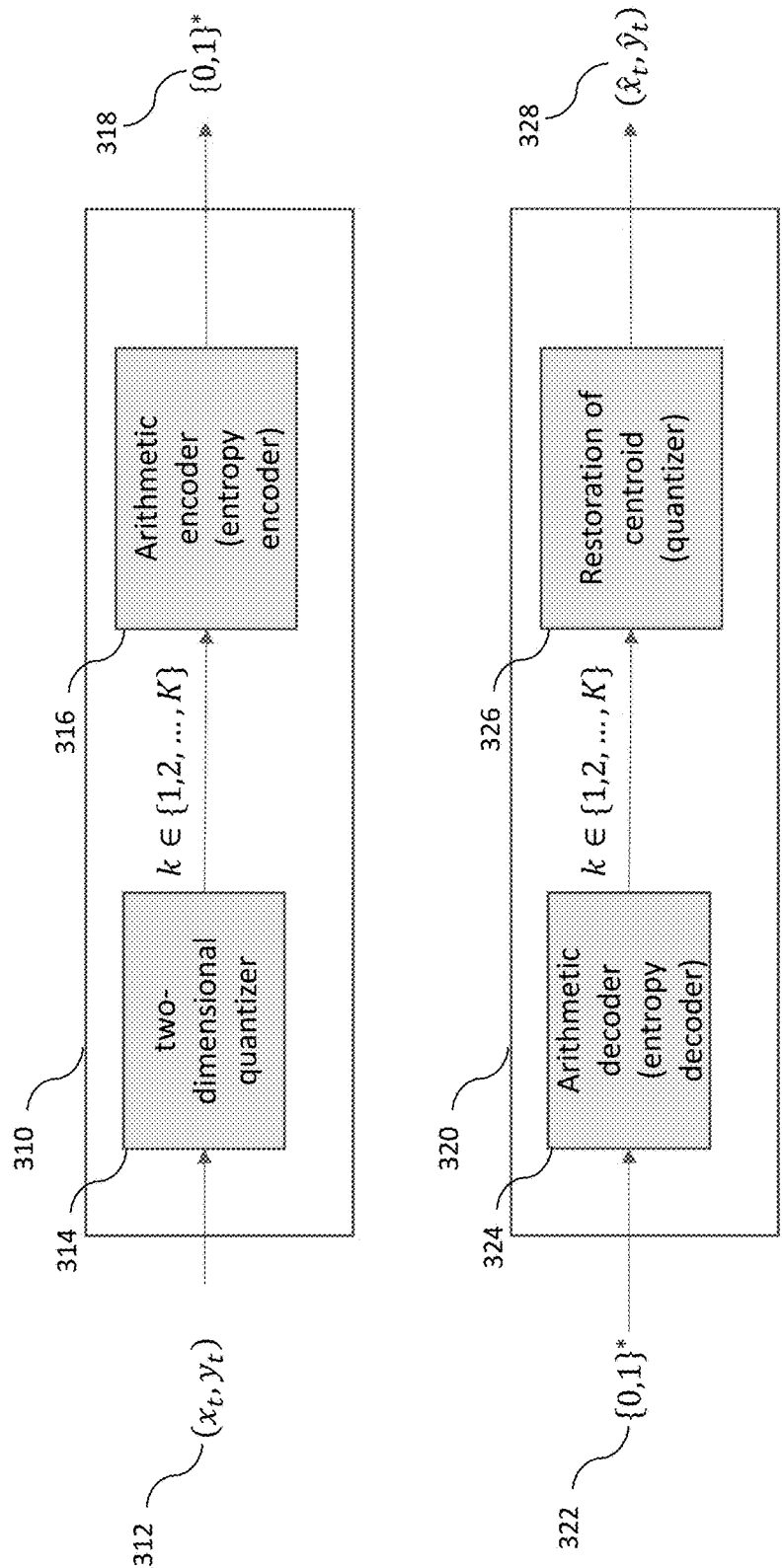
FIG. 3 is a block diagram of an encoder-decoder system, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle.

Further, during roadway operation of a vehicle by a vehicle operator, semi-autonomously or fully autonomous, the vehicle may be an observer in a driving scene which includes a driving environment, for example the roadway, surrounding infrastructure, objects, signs, hazards, and other vehicles sharing the roadway collectively referred to herein as objects or targets. Objects may be static, such as road signage, or dynamic, such as another vehicle traversing the roadway. Driver, operator, vehicle operator are terms that are meant to be interchangeable and are not meant to limit the scope of the disclosure.

FIG. 1 is an illustration of gaze pattern 110 and gaze pattern 120 from the perspective of a vehicle operator looking out of a front windshield, according to an embodiment of the present disclosure. Gaze pattern 110 may contain a single area, for example target area 115. Target area 115 represents a cluster of eye gaze directional points. Further, eye gaze data points are continuous, and may also be referred to as floats. Target area 115 may represent a vehicle operator's gaze straight ahead, for example when driving down a straight highway. In such a scenario there may be little need to look far right or far left. Further, such a gaze may also infer that traffic may be fairly light as there appears to be little eye gaze direction towards a rearview mirror or side mirrors, if so equipped.

In contrast, gaze pattern 120 represents four distinct areas. Target area 122 may represent looking forward, but it is wider than target area 115 and therefore represents an eye gaze pattern of scanning a wider field of view than that of target area 115. Further, gaze pattern 120 may also include target area 128 representing the vehicle operator looking at the rearview mirror. In addition, target area 124 may represent the vehicle operator looking at the left-hand side mirror and target area 126 may represent the vehicle operator looking at the right-hand side mirror. Accordingly, gaze pattern 120 does not appear to represent the same pattern, and hence the same driving environment as gaze pattern 110. Gaze pattern 120 may more closely correspond to city driving, or a more congested highway driving scenario where the driver may tend to check all the mirrors on a fairly frequent basis.

Eye gaze direction data is a sequence that may be represented as follows:

$$(x_0, y_0), (x_1, y_1), \ldots, (x_{t-1}, y_{t-1}), (x_t, y_t)$$

Where the subscript denotes time and the pair is a point on a two-dimensional plane. The joint distribution from which these points are taken may be approximated as a Gaussian mixture as follows:

$$f_{X,Y|\Theta}(x, y|\Theta) = \sum_{i=1}^{M} \rho_i f_{X,Y|\theta_i}(x, y|\theta_i)$$

Where $\rho_i$ are the components weights and the component densities are Gaussian, thus $\theta_i = \mu_i$, $C_i$ represents the mean and variance of the $i^{th}$ component.

Figure 2:
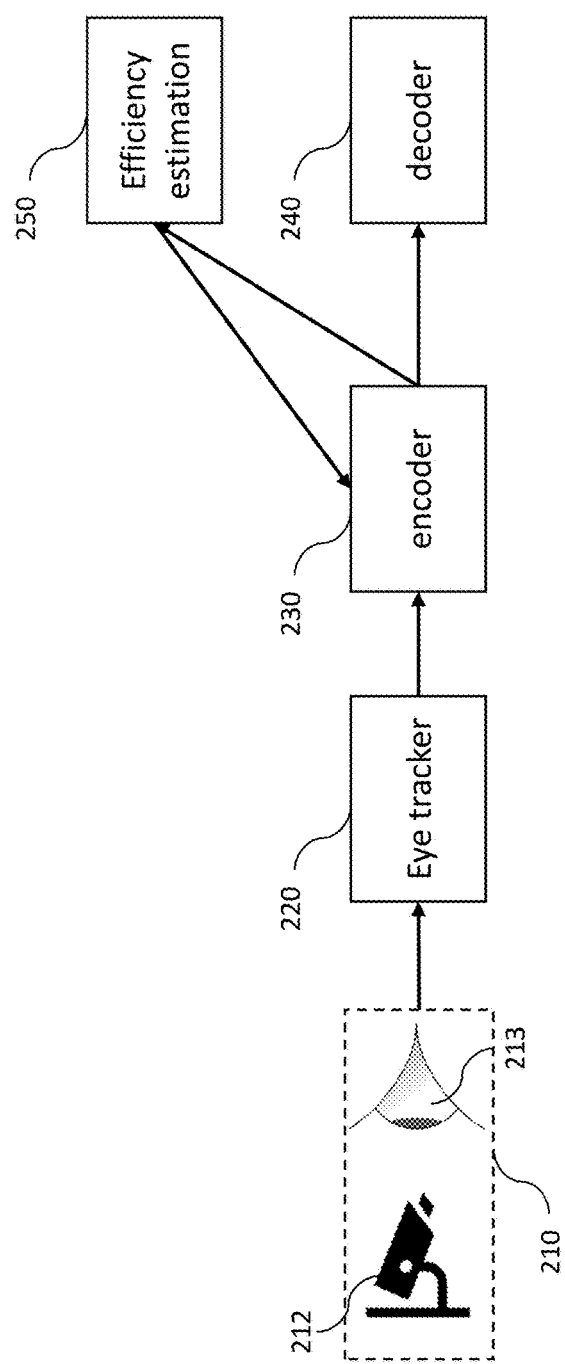
FIG. 2 is an illustration of a single view eye tracker system with efficiency estimation, in accordance with the disclosure.

FIG. 2 illustrates a single view eye tracker system 200, according to an embodiment of the present disclosure. System 200 may include an inward facing camera component 210 that may include a camera 212 directed to the face and eyes 213 of the vehicle operator. Camera 212 may be another type of imaging device including but not limited to an optical camera, an infrared imaging device, a light-emitting-diode (LED) device, an ultrasound sensor and the like.

System 200 may also include an eye tracker component 220, an encoder 230, a decoder 240, and an efficiency estimation component 250. In an embodiment, system 200 may operate in an offline mode where camera 212 produces an image stream of the vehicle operator's face including the eyes 213 and forwards that image stream to the eye tracker component 220. Eye tracker component 220 may then analyze the image stream to estimate the direction of gaze of the vehicle operator. Encoder 230 may then encode the gaze data that may then be transmitted over a bandwidth limited channel to the decoder 240 and the efficiency estimation component 250. Encoder 230 may include a codebook where the codebook may contain a set of encoding and decoding parameters. The encoding/decoding parameters of a codebook may be optimized for a particular driving scenario. As discussed in FIG. 1, gaze pattern 110 may be associated with driving on a straight highway as there is a single cluster of gaze direction in the middle of gaze pattern 110. In FIG. 2, if encoder 230 receives an image stream that contains a similar gaze pattern then the codebook may be well suited with its encoding/decoding parameters to efficiently encode and decode the data for transmitting over a limited bandwidth channel.

However, if the image stream in FIG. 2 is more consistent with gaze pattern 120 then the codebook may not efficiently encode and decode the estimated direction of gaze data resulting in a poor or corrupted restoration from the decoder. In such a situation the efficiency estimation component 250 may report that the present codebook being used in system 200 is not optimal and that a different codebook may be needed. Such reporting may be done to a back-office system over the cloud or other means of transmission.

FIG. 3 illustrates a structure of an encoder-decoder 300, according to an embodiment of the present disclosure. Encoder 310 may include a two-dimensional quantizer 314, an arithmetic encoder 316 that may accept input data 312, and output data 318. Decoder 320 may include an arithmetic decoder 324, a quantizer 326, input data 322, and output data 318:

Two-dimensional quantizer 314 may partition a two-dimensional space into a number of Voronoi cells and the finding a centroid of each cell including estimating a probability of each cell. This may be done using Lloyd clustering using training data. In addition, another approach may be to approximate the distribution model of the source for the creation of synthetic, e.g., pseudo randomly generated, points, for example, when a training set is minimal making the design of the vector quantization difficult.

The arithmetic encoder 316, given a discrete set and its probabilities from the two-dimensional quantizer 314, may produce a sequence over this set that can be compressed, for example, with a compression ratio approaching the theoretical limit of the source entropy. The resulting binary sequence, e.g., codewords k, may vary in length, e.g., block to variable encoding. The output data 318 from the arithmetic encoder 316 may then be sent to the arithmetic decoder 324 and received as input data 322.

The arithmetic decoder 324, may already know the set and probabilities and thus may losslessly decode the binary sequence encoded by the arithmetic encoder 316. The result of the decoding may be then be input to the quantizer 326 to restore the original centroid. The output of the quantizer 326, output 328, may be an index representing the original Voronoi cell. This index may be taken from a discrete finite set, of size K, where the arithmetic encoder 316 may encode the index into a binary sequence. The arithmetic decoder 324 may then receive the codeword output and extract the index of the Voronoi cell. However, the restoration may not result in the exact centroid of the Voronoi cell and thus the overall encode and decoding process is lossy.

Regarding the efficiency estimation component 250, the efficiency estimation is targeted to assess the efficiency of the communication of the encoder/decoder process. The efficiency estimation component 250 may not have any knowledge of the specific codebook being used in the system 200, but it is known that the number of Voronoi cells in the quantization are bounded by the limit K as used in FIG. 3. The method of efficiency estimation may include applying a Context Tree Weighted (CTW) approach for the estimation of the entropy. The estimated normalized entropy may be shown as follows:

$H_{CTW}(X)$, where X is the binary sequence communicated.

Further, the efficiency of the communication may be determined by:

$$\frac{1}{\log K - H_{CTW}(X)}$$

However, if $H_{CTW}(X) \geq \log K$ then the estimation error may be too large and thus may be disregarded.

Figure 4:
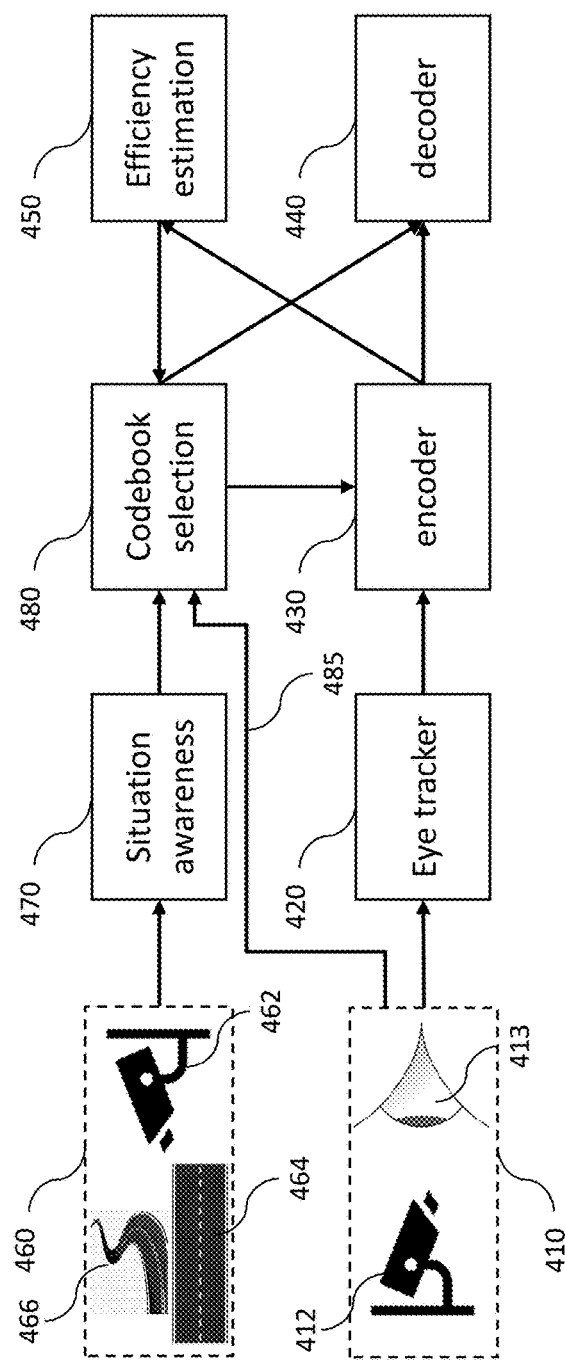
FIG. 4 is an illustration of a dual view eye tracker system with efficiency estimation, in accordance with the disclosure.

FIG. 4 is an illustration of an offline dual view eye tracker system 400, according to an embodiment of the present disclosure. System 400 may include an inward facing camera component 410 that may include a camera 412 directed to the face and eyes 413 of the vehicle operator. Camera 412 may be any type of imaging device including but not limited to an optical camera, an infrared imaging device, a light-emitting-diode (LED) device and the like. Camera 412 may also be another type of sensor, such as a sound recording device or movement sensor.

System 400 may also include an eye tracker component 420, an encoder 430, a decoder 440, an efficiency estimation component 450, and an outward facing camera component 460, a situation awareness component 470, and a codebook selection component 480. Outward facing camera component 460 may also include an outward facing camera 462 directed towards the surrounding environment, for example a straight roadway 464 or a curved roadway 466. The surrounding environment may include other attributes, for example an intersection, other vehicles, buildings, people, or other object. Further, inward facing camera 412 and outward facing camera 462 may include additional image capture devices facing inwards and/or outwards. For example, outward facing camera component 460 may include multiple image capture devices situated around the outside of a vehicle to provide a three-hundred-sixty degree view. In a similar manner, inward facing camera component 410 may include multiple image capture devices and controllers situated around the inside of a vehicle. Further, in addition to including additional image capture device inside and outside of the vehicle, in an embodiment, a single image capture device producing a video stream may include multiple controllers and processors where each controller or processor may be dedicated to a specific function regarding the video stream. For example, processor to analyze a soundtrack associated with the video stream.

System 400 may include where outward facing camera 462 sends one or more video streams to the situation awareness component 470. The situation awareness component 470 may use a variety of sensors and controllers in the vehicle to analyze the surrounding scene in the vicinity of the vehicle. Based on such an analysis, the situation awareness component 470 may select the most similar scene from a fixed list of known scenes. For example, outward facing camera 462 may determine that the scene in front of the vehicle is a straight highway, such as straight roadway 464 and thus may select a "straight roadway" scene from a list of known scenes. Further, situation awareness component 470 may use other data in analyzing surrounding scenes and selecting the most appropriate scene from the fixed list of known scenes. The other data may include global positioning system data, for example, location and speed to indicate the vehicle is in an urban or rural area and thus may have different codebooks. In addition, different vehicle speeds may also determine a selection of a different scene and thus different codebooks by codebook selection component 480.

Additional data sources for the situation awareness component 470, which may also be referred to as a controller, may include components such as an inertial measurement unit that may indicate acceleration or deceleration where the codebook may be adjusted to fit the scenario, or lateral acceleration to indicate steering wheel turns. Pedal control positions or turn signal may also be used, for example a left turn may indicate a particular codebook while a right turn would necessitate a different codebook. Object sensors such as radar may call for different codebooks for different kinds of objects in the scene, for example, animals, pedestrians, trucks, or emergency vehicles to name a few. Or, the existence of free space when the vehicle may not move due to other vehicles blocking its path, such as in a parking lot where the free space may be located in any direction relative to the vehicles direction of travel.

The situation awareness component 470 may then forward its selected scene, from a list of fixed, predefined scenes to the codebook selection component 480. Codebook selection component 480 may then, based on the selected scene, select a codebook from a set of possible codebooks that best matches the selected predefined scene. The codebook selection component 480 may then provide the selected codebook to both encoder 430 and decoder 440.

Canonical state signals from the situation awareness component 470 may be used by the codebook selection component 480 to assess the mean and variance of distributions, O, and the number of Gaussian distributions in the model mixture, M. Assuming a set of quantizers, based on different Gaussian mixture models, the best, or closest, fit for the parameters may be found. Then, the index of the selected codebook may be communicated by the codebook selection component 480 to the decoder 440 as discrete values at low frequencies. The chosen quantizer may then be used by both encoder 430 and decoder 440 of the next T eye gaze direction data points.

The inward facing camera component 410 may include a camera 412 directed to the face and eyes 413 of the vehicle operator. Camera 412 may produce an image stream of the vehicle operator's face include the eyes 413 and forwards that image stream to the eye tracker component 420. Eye tracker component 420 may then analyze the image stream to estimate the direction of gaze of the vehicle operator. The estimation direction of gaze may then be sent to encoder 430 for encoding using the codebook selected by codebook selection component 480 as previously discussed. The encoded data may then be transmitted, e.g., using a transmitter located within the vehicle, over the bandwidth limited channel by encoder 430 to the decoder 440 for decoding based on the codebook sent by the codebook selection component 480. Encoder 430 may also send the encoded data to efficiency estimation component 450 where, if the efficiency of the encoding/decoding process is not as expected, e.g., less than a predetermined threshold, the efficiency estimation component 450 may signal to the codebook selection component 480 to select a different codebook to be used by encoder 430 and decoder 440 with the goal to increase efficiency, as discussed in FIG. 2.

Further, a driver state may act as an additional input factor in the selection of a codebook as shown by input 485. Driver state scores may be associated with risk and workload that may have a significant effect on gaze patterns selection.

Figure 5:
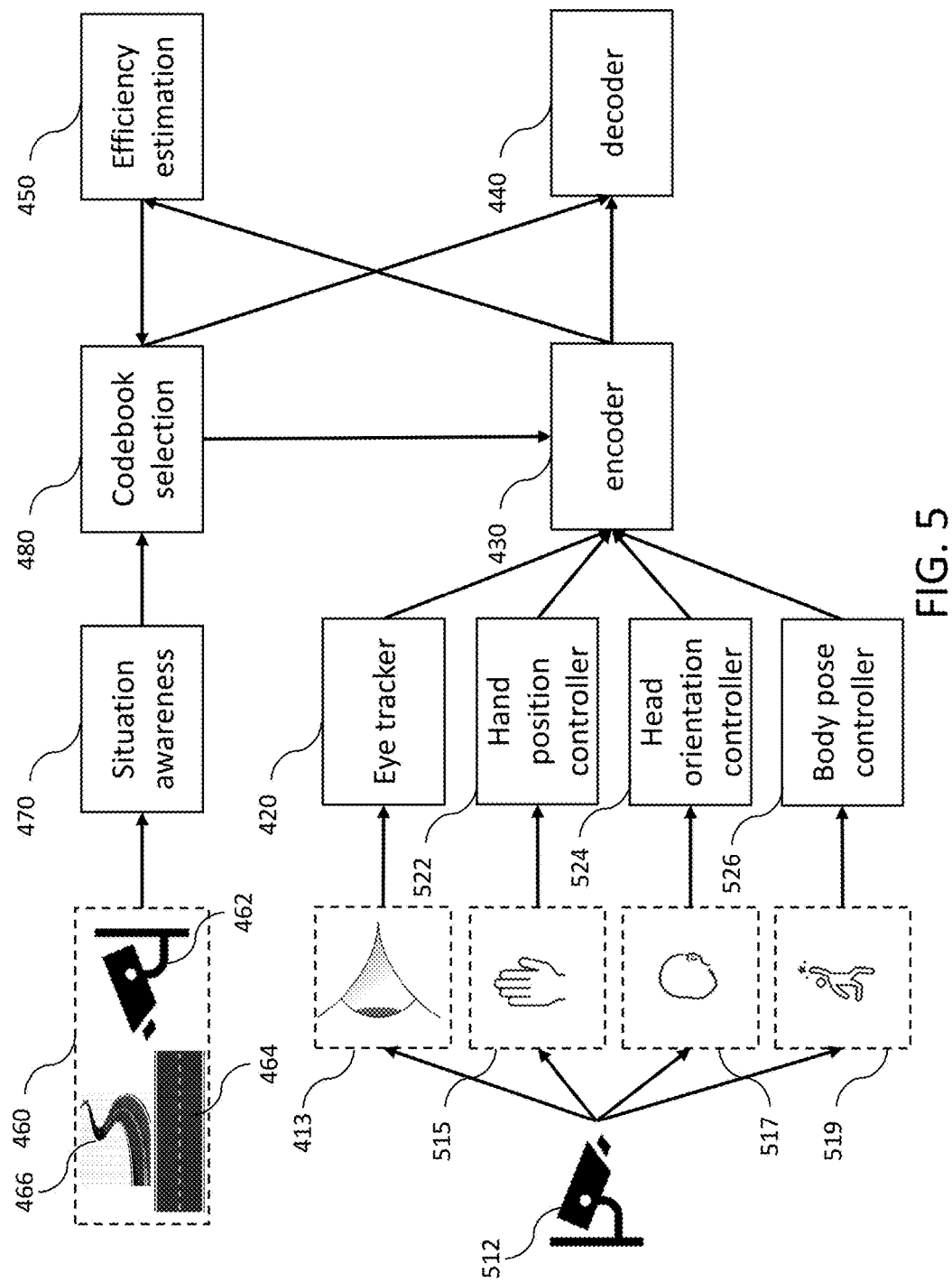
FIG. 5 is an illustration of a dual view multi-attribute tracker system with efficiency estimation, in accordance with the disclosure.

FIG. 5 is an illustration of an offline dual view multi-attribute tracker system 500, according to an embodiment of the present disclosure. System 500 may include a number of the same components as discussed in FIG. 4. For example, system 500 may include the eye tracker component 420, the encoder 430, the decoder 440, the efficiency estimation component 450, the outward facing camera component 460, the situation awareness component 470, and the codebook selection component 480. Outward facing camera component 460 may also include an outward facing camera 462 directed towards the surrounding environment, for example a straight roadway 464 or a curved roadway 466.

System 500 may include some additional components, for example an inward facing camera 512, a hand position controller 522 directed to capture a position and movement of hand 515, a head orientation controller 524 directed to capture a position and movement of head 517, and a body pose controller 526 directed to capture a position and movement of body 519 of the vehicle operator.

Inward facing camera 512 may include multiple imaging devices creating multiple video streams. Or alternately, inward facing camera 512 may include a single imaging device with multiple controllers situated to analyze different aspects of the vehicle operator. The hand position controller may track a position and movement of hand 515. The head orientation controller 524 may track a position and movement of head 517. The body pose controller may track a position and movement of body 519 of the vehicle operator. Eye gaze, as discussed in FIG. 4, may be a significant indicator of behavior in a situation, but other actions of a vehicle operator may provide additional insight. Accordingly, eye tracker component 420, hand position controller 522, head orientation controller 524, and body pose controller 526 may output their data to encoder to be processed as discussed in FIG. 4. In addition to tracking eye, hand, head orientation, and body position, the use of images and sequences of images may also be associated with a situation, for example, the turning of a head from center to right may be an indication of a right turn in a vehicle.

FIGS. 2-5 have primarily been directed to an off-line approach of context-based encoding of eye and body gaze. However, as an alternative, an on-line approach that includes designing specific codebooks rather than predefined codebooks may also be used. In addition, either off-line or on-line methods may also include further improvement by a use of decoding of sequences utilizing a delta encoding approach.

As previously discussed, canonical state signals from the situation awareness component 470 may be used by the codebook selection component 480 to assess the mean and variance of distributions, $\Theta$, and the number of Gaussian distributions in the model mixture, M. Using this approach, the canonic state signals may be communicated to decoder 440. As such communication may be done at lower frequencies, a reasonable resolution with limited averaged rate may be achieved. Given the canonical state signals and the L previously communicated signals, centroids may be represented as:

$$(\hat{x}_{t-1-L}, \hat{y}_{t-1-L}), (\hat{x}_{t-L}, \hat{y}_{t-L}), \ldots, (\hat{x}_{t-1}, \hat{y}_{t-1})$$

Both encoder 430 and decoder 440 may estimate a Generalized Method of Moments (GMM) and design a two-dimensional quantizer, based on estimation maximization using canonical state signals, and a vector quantizer design based on Voronoi cells, centroids, and probabilities.

A standard approach to the estimation of a GMM may be the estimation-maximization (EM) method where this method may be used to monotonically increase the log-likelihood. Thus, assume the L previous data point may be denoted as $x_n$, for $n \in \{1, 2, \ldots L\}$. Accordingly, for the GMM the EM algorithm iteratively yields estimates as follows:

$$\rho_i^{(k+1)} = \frac{1}{L}\sum_{n=1}^{L} v_i^{(k)}(n)$$

$$\mu_i^{(k+1)} = \frac{\sum_{n=1}^{L} v_i^{(k)}(n) x_n}{\sum_{n=1}^{L} v_i^{(k)}(n)}$$

$$C_i^{(k+1)} = \frac{\sum_{n=1}^{L} v_i^{(k)}(n)(x_n - \mu_i^{(k+1)})(x_n - \mu_i^{(k+1)})}{\sum_{n=1}^{L} v_i^{(k)}(n)}$$

$$v_i^{(k)}(n) = \frac{\rho_i^{(k)} f_{X|\mu_i^{(k)}, C_i^{(k)}}(x_n | \mu_i^{(k)}, C_i^{(k)})}{\sum_{j=1}^{M} \rho_j^{(k)} f_{X|\mu_j^{(k)}, C_j^{(k)}}(x_n | \mu_j^{(k)}, C_j^{(k)})}$$

The canonical state signals may be used in two ways. First, assuming an assessment of the mean and/or variance and/or component weights and/or M are exact and perform the estimation with these values are constants. Second, the assessment may be used as an initial educated guess of the values. However, in both cases the approach is bound to improve a convergence rate and an ultimate final estimation.

Figure 6:
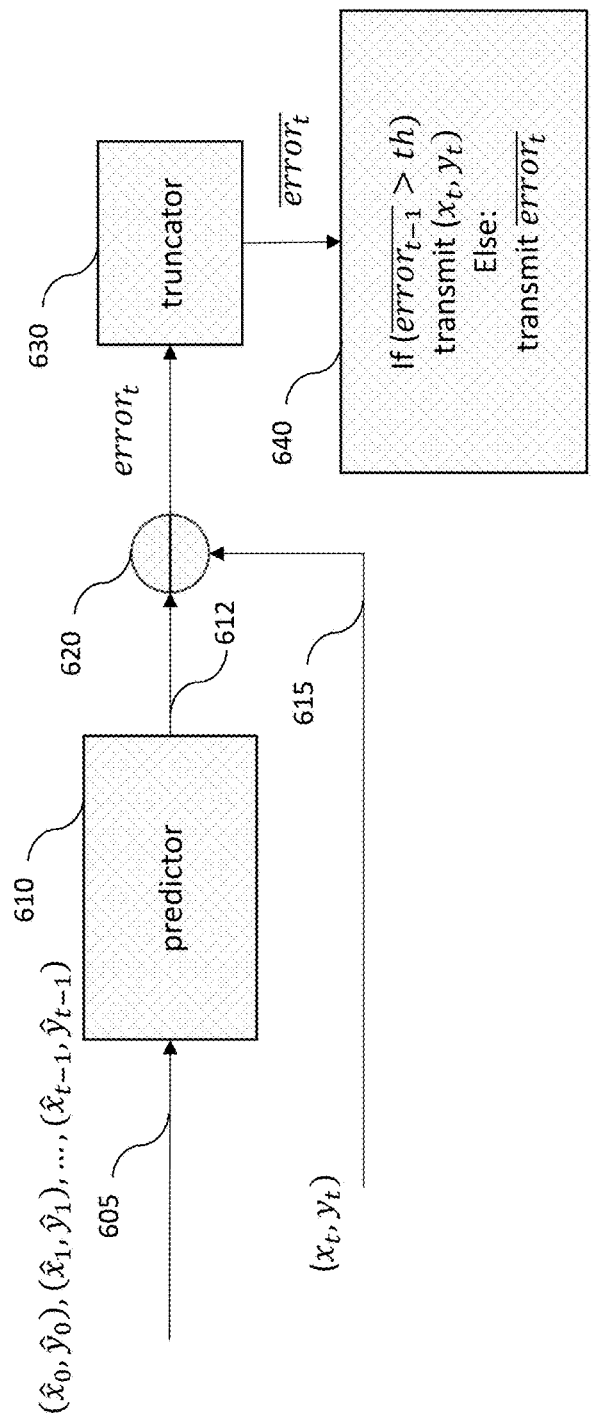
FIG. 6 is an illustration of a delta encoding method, in accordance with the disclosure.

FIG. 6 is an illustration of a delta encoding method 600, according to an embodiment of the present disclosure. A delta encoding may also be used for an on-line approach of context-based encoding of eye and body gaze. Eye-gaze data points may be initially thought to be independent, but in actuality may be considered highly dependent. In such a situation delta encoding may be more beneficial. One approach may be to use a dynamic delta encoding approach that may facilitate both an off-line as well as an on-line approach. Method 600 may include an input 605 that may be sent to a predictor 610. Input 605 may include a set of data points prior to time t, e.g., $(\hat{x}_0, \hat{y}_0), (\hat{x}_1, \hat{y}_1), \ldots, (\hat{x}_{t-1}, \hat{y}_{t-1})$, where predictor 610 then generates a predicted value 612 for time t. Comparator 620 then may then compare the predicted values 612 with the actual value 615 ($x_t$, $y_t$) and outputs the difference as an error amount $error_t$. Truncator 630 may then truncate $error_t$ shown as $\overline{error_{t-1}}$, in an effort to minimize data transmission from truncator 630. Thus, when the error is small enough a single bit flag may be transmitted. Decision 640 may determine that if the truncated error is greater than a threshold amount then the actual ($x_t$, $y_t$) value is sent. If the truncated error is less than the threshold amount then the actual truncated error amount, $\overline{error_{t-1}}$, is sent.

Figure 7:
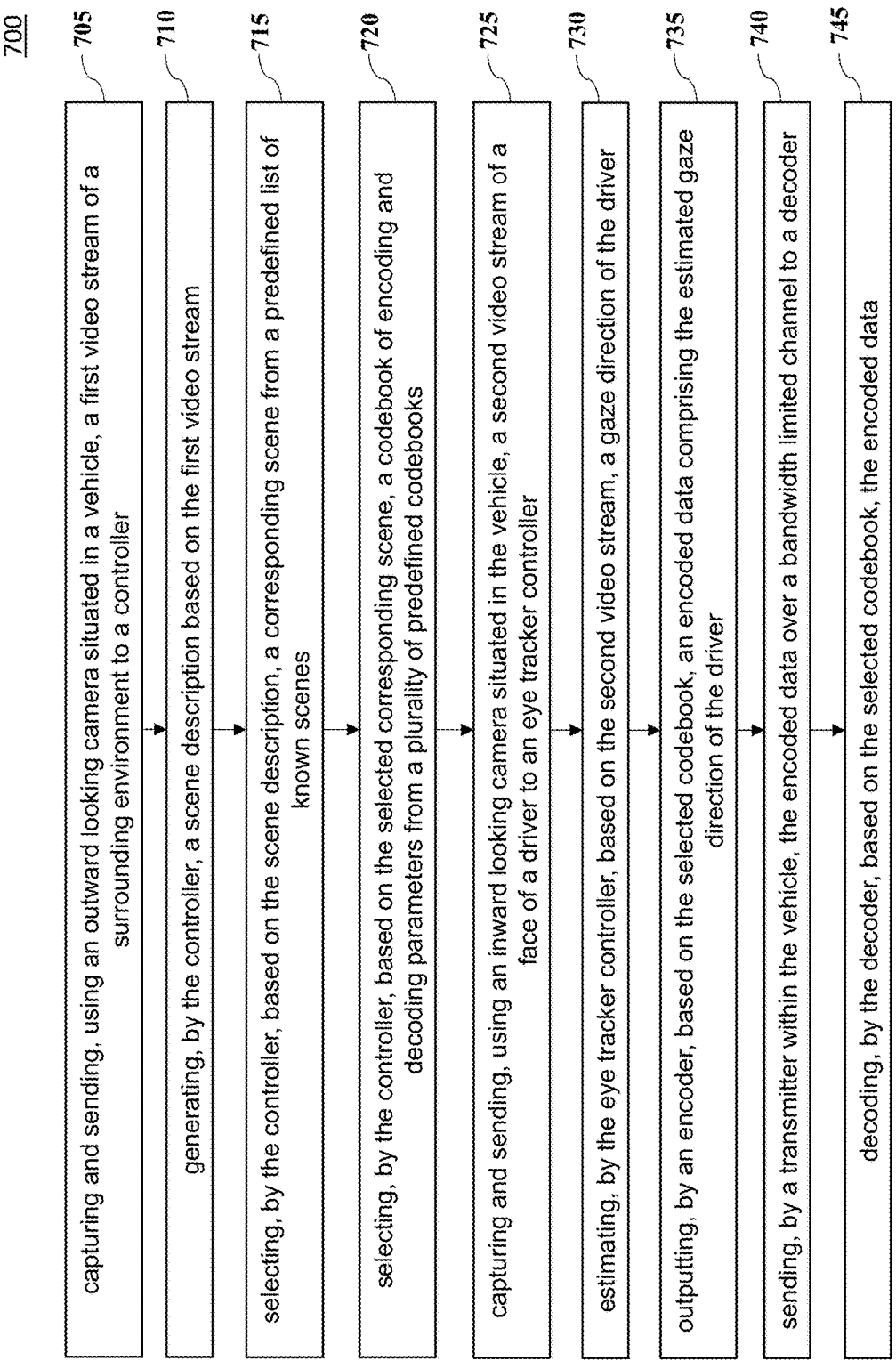
FIG. 7 depicts a flowchart of a method for limited rate context-based eye gaze encoding, in accordance with the disclosure.

FIG. 7 illustrates a detail flowchart of a method 700 for limited rate context-based eye gaze encoding, according to an embodiment of the present disclosure. Step 705 may include capturing and sending, using an outward looking camera situated in a vehicle, a first video stream of a surrounding environment to a controller. As discussed in FIG. 4, system 400 may include an outward facing camera 462 directed towards the surrounding environment, for example a straight roadway 464 or a curved roadway 466. The surrounding environment may include other attributes, for example an intersection, other vehicles, buildings, people, or other object. Outward facing camera component 460 may include multiple image capture devices situated around the outside of a vehicle to provide a three-hundred-sixty-degree view.

Step 710 may include generating, by the controller, a scene description based on the first video stream. Step 715 may include selecting, by the controller, based on the scene description, a corresponding scene from a predefined list of known scenes. As discussed in FIG. 4, the situation awareness component 470 may use a variety of sensors and controllers in the vehicle to analyze the surrounding scene in the vicinity of the vehicle. Based on such an analysis, the situation awareness component 470 may select the most similar scene from a fixed list of known scenes. For example, outward facing camera 462 may determine that the scene in front of the vehicle is a straight highway, such as straight roadway 464 and thus may select a "straight roadway" scene from a list of known scenes. Further, the situation awareness component 470 may use other data in analyzing surrounding scenes and selecting the most appropriate scene from the fixed list of known scenes.

Step 720 may include selecting, by the controller, based on the selected corresponding scene, a codebook of encoding and decoding parameters from a plurality of predefined codebooks. As discussed in FIG. 4, the situation awareness component 470 may then forward its selected scene, from a list of fixed, predefined scenes to the codebook selection component 480. Codebook selection component 480 may then, based on the selected scene, select a codebook from a set of possible codebooks.

Step 725 may include capturing and sending, using an inward looking camera situated in the vehicle, a second video stream of a face of a driver to an eye tracker controller. As discussed in FIG. 4, the inward facing camera component 410 may include a camera 412 directed to the face and eyes 413 of the vehicle operator, where camera 412 may produce an image stream of the vehicle operator's face include the eyes 413 and forwards that image stream to the eye tracker component 420.

Step 730 may include estimating, by the eye tracker controller, based on the second video stream, a gaze direction of the driver. As discussed in FIG. 4, eye tracker component 420 may then analyze the image stream to estimate the direction of gaze of the vehicle operator.

Step 735 may include outputting, by an encoder, based on the selected codebook, an encoded data comprising the estimated gaze direction of the driver. As discussed in FIG. 4, the situation awareness component 470 may then forward its selected scene, from a list of fixed, predefined scenes to the codebook selection component 480. Codebook selection component 480 may then, based on the selected scene, select a codebook from a set of possible codebooks that best matches the selected predefined scene. The codebook selection component 480 may then provide the selected codebook to both encoder 430 and decoder 440.

Step 740 may include sending, by a transmitter within the vehicle, the encoded data over a bandwidth limited channel to a decoder. As discussed in FIG. 4, the encoded data may then be transmitted, e.g., using a transmitter located within the vehicle, over the bandwidth limited channel by encoder 430 to the decoder 440 for decoding based on the codebook sent by the codebook selection component 480.

Step 745 may include decoding, by the decoder, based on the selected codebook, the encoded data. As discussed in FIG. 4, the encoder 430 may also send the encoded data to efficiency estimation component 450 where, if the efficiency of the encoding/decoding process is not as expected, e.g., less than a predetermined threshold, the efficiency estimation component 450 may signal to the codebook selection component 480 to select a different codebook to be used by encoder 430 and decoder 440 with the goal to increase efficiency, as discussed in FIG. 2.

Method 700 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for limited rate context-based eye gaze encoding comprising:
an outward looking camera, situated in a vehicle, configured to capture and send a first video stream of a surrounding environment to a controller, wherein the controller, based on the first video stream, is configured to generate and encode a scene description;
the controller further configured to select, based on an encoded scene description, a corresponding scene from a predefined list of known scenes;
the controller further configured to select, based on the selected corresponding scene, a codebook of encoding and decoding parameters from a plurality of predefined codebooks;
an inward looking camera, situated in the vehicle, configured to capture and send a second video stream of a face of a driver to an eye tracker controller, wherein the eye tracker controller, based on the second video stream, is configured to estimate a gaze direction of the driver;
an encoder configured to output, based on a selected codebook, an encoded data comprising the estimated gaze direction of the driver; and
a transmitter, within the vehicle, configured to send the encoded data over a bandwidth limited channel to a decoder, wherein the decoder is configured to receive the selected codebook from the controller and to decode, based on the selected codebook, the encoded data.

2. The system of claim 1, further comprising an efficiency estimation component configured to receive the encoded data and determine an efficiency of the encoding.

3. The system of claim 2, wherein if the efficiency of the encoding is below a predetermined threshold the selected codebook is replaced with a different codebook.

4. The system of claim 1, wherein the decoder is located within the vehicle.

5. The system of claim 1, wherein the inward looking camera situated in the vehicle is further configured to capture an image of a hand of the driver and wherein a hand position controller is configured to estimate an orientation of the hand of the driver, and wherein the encoder is further configured to output the encoded data comprising the orientation of the hand of the driver.

6. The system of claim 1, wherein the inward looking camera situated in the vehicle is further configured to capture an image of a head of the driver and wherein a head orientation controller is configured to estimate an orientation of the head of the driver, and wherein the encoder is further configured to output the encoded data comprising the orientation of the head of the driver.

7. The system of claim 1, wherein the inward looking camera situated in the vehicle is further configured to capture an image of a body of the driver and wherein a body pose controller is configured to estimate a pose of the body of the driver, and wherein the encoder is further configured to output the encoded data comprising the pose of the body of the driver.

8. The system of claim 1, wherein the controller is further configured to select the corresponding scene from the predefined list of known scenes also based on a location, or a speed, or an acceleration, or a pedal position, or a turn signal status of the vehicle.

9. The system of claim 1, wherein the controller is configured to generate a new codebook based on the corresponding scene.

10. A method for limited rate context-based eye gaze encoding comprising:
capturing and sending, using an outward looking camera situated in a vehicle, a first video stream of a surrounding environment to a controller;
generating, by the controller, a scene description based on the first video stream;
selecting, by the controller, based on the scene description, a corresponding scene from a predefined list of known scenes;
selecting, by the controller, based on the selected corresponding scene, a codebook of encoding and decoding parameters from a plurality of predefined codebooks;
capturing and sending, using an inward looking camera situated in the vehicle, a second video stream of a face of a driver to an eye tracker controller;
estimating, by the eye tracker controller, based on the second video stream, a gaze direction of the driver;
outputting, by an encoder, based on the selected codebook, an encoded data comprising the estimated gaze direction of the driver;
sending, by a transmitter within the vehicle, the encoded data over a bandwidth limited channel to a decoder; and
decoding, by the decoder, based on the selected codebook, the encoded data.

11. The method of claim 10, further comprising receiving the encoded data and determining an efficiency of the encoding.

12. The method of claim 11, further comprising replacing the selected codebook if the efficiency of the encoding is below a predetermined threshold with a different codebook.

13. The method of claim 10, wherein the decoder is located within the vehicle.

14. The method of claim 10, further comprising capturing, using the inward looking camera situated in the vehicle, an image of a hand of the driver, and estimating, using a hand position controller, an orientation of the hand of the driver, and outputting, by the encoder, the encoded data comprising the orientation of the hand of the driver.

15. The method of claim 10, further comprising capturing, using the inward looking camera situated in the vehicle, an image of a head of the driver, and estimating, using a head orientation controller, an orientation of the head of the driver, and outputting, by the encoder, the encoded data comprising the orientation of the head of the driver.

16. The method of claim 10, further comprising capturing, using the inward looking camera situated in the vehicle, an image of a body of the driver, and estimating, using a body pose controller, a pose of the body of the driver, and outputting, by the encoder, the encoded data comprising the pose of the body of the driver.

17. The method of claim 10, further comprising selecting the corresponding scene from the predefined list of known scenes based also on a location, or a speed, or an acceleration, or a pedal position, or a turn signal status of the vehicle.

18. The method of claim 10, further comprising selecting the corresponding scene from the predefined list of known scenes based also on a detected target and an amount of free space around the vehicle.

19. The method of claim 10, further comprising generating a new codebook based on the corresponding scene.

20. A method for on-line limited rate context based eye gaze encoding comprising:
capturing and sending, using an outward looking camera situated in a vehicle, a first video stream of a surrounding environment to a controller;

generating, by the controller, a scene description based on the first video stream;

generating, by the controller, based on the scene description, a codebook of encoding and decoding parameters;

capturing and sending, using an inward looking camera situated in the vehicle, a second video stream of a face of a driver to an eye tracker controller;

estimating, by the eye tracker controller, based on the second video stream, a gaze direction of the driver;

outputting, by an encoder, based on the codebook, an encoded data comprising the estimated gaze direction of the driver;

sending, by a transmitter within the vehicle, the encoded data at a first rate over a bandwidth limited channel to a decoder;

sending, by the transmitter within the vehicle, the scene description at a second rate over the bandwidth limited channel to the decoder, wherein the second rate is lower than the first rate; and decoding, by the decoder, based on the codebook, the encoded data.

\* \* \* \* \*